United States Patent [19]

Yokota

[11] 4,045,344

[45] Aug. 30, 1977

[54] APPARATUS FOR TREATING WASTE WATER

[75] Inventor: Ittshu Yokota, Zentsuji, Japan

[73] Assignee: Ishigaki Kiko Co., Ltd., Tokyo, Japan; a part interest

[21] Appl. No.: 465,102

[22] Filed: Apr. 29, 1974

[51] Int. Cl.² .............................................. C02C 1/04
[52] U.S. Cl. .................................. 210/106; 210/151; 210/194; 210/521
[58] Field of Search ............... 210/17, 87, 150, 151, 210/197, 255, 521, 106, 194; 261/77, 94, 121 R

[56] References Cited

U.S. PATENT DOCUMENTS

| 2,163,452 | 6/1939 | Schmieg | 210/197 X |
| 3,112,261 | 11/1963 | Porter et al. | 210/17 |
| 3,261,779 | 7/1966 | Sullins et al. | 210/17 X |
| 3,329,271 | 7/1967 | Ward et al. | 210/150 |
| 3,402,103 | 9/1968 | Amberg et al. | 210/17 X |
| 3,402,125 | 9/1968 | Tanaka | 210/151 X |
| 3,443,694 | 5/1969 | Malinovsky | 210/221 X |
| 3,468,795 | 9/1969 | Bye-Jorgensen et al. | 210/17 X |
| 3,640,387 | 2/1972 | Conley et al. | 210/521 X |
| 3,746,167 | 7/1973 | Arthur | 210/87 X |
| 3,812,970 | 5/1974 | Yamazaki | 210/521 X |

*Primary Examiner*—Wilbur L. Bascomb, Jr.
*Assistant Examiner*—Robert H. Spitzer

[57] ABSTRACT

An apparatus for treating waste water such as sewage in which at least one bundle of a number of straight tubes is submerged in waste water to be treated, said bundle being particularly provided with a plurality of crossing passages extending across the bundle which passages are arranged intermittently along the bundle with certain intervals therebetween so that no Poiseuille flow is substantially formed in each of the tubes. The waste water is flowed through the bundle of straight tubes in a direction along the bundle. In the bundle of straight tubes, organic substances in the waste water are removed due to decomposition caused by microorganisms which adhere to the inner surface of each tube. Owing to the presence of the crossing passages, removal of the organic substances proceeds effectively and promptly due to uniform flow distribution across the bundle, a disturbance of flow given to the water, propagation of various kinds of microorganisms and the like.

14 Claims, 15 Drawing Figures

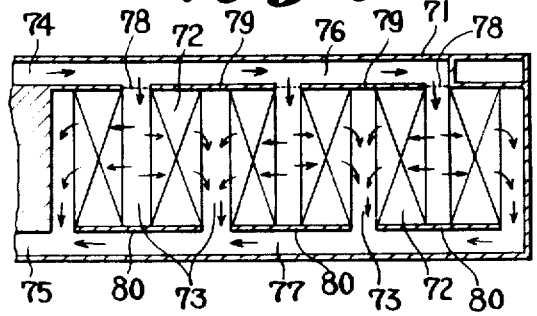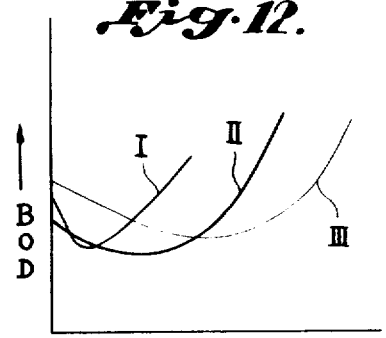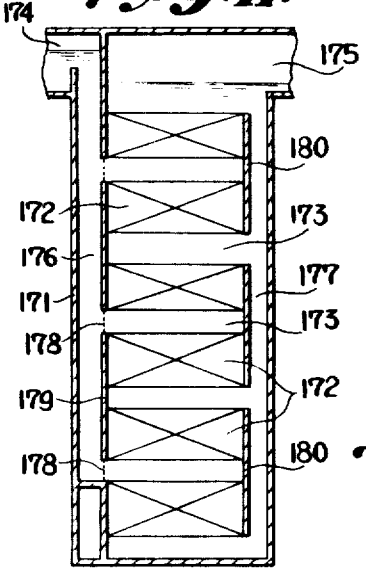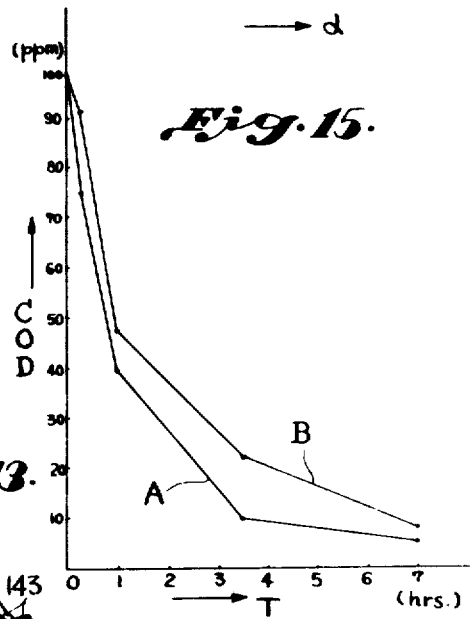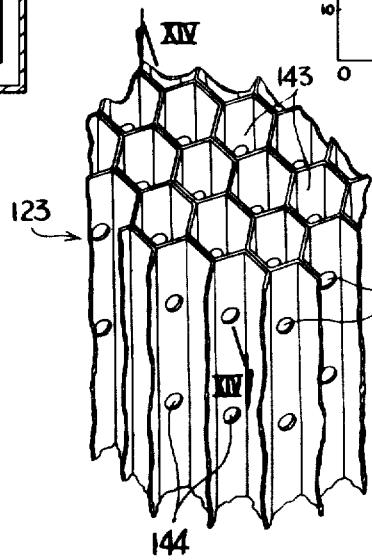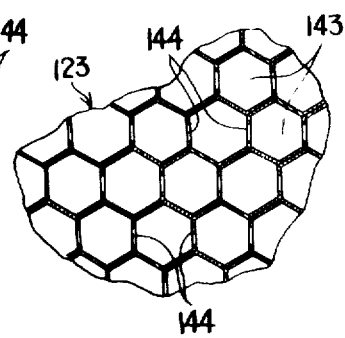

APPARATUS FOR TREATING WASTE WATER

This invention relates to a novel and improved apparatus for treating waste water, and more particularly to an apparatus for treating waste water containing organic substances in which apparatus the organic substances are removed due to decomposition of the same by the action of microorganisms.

The treatment of waste water for purifying the same has obtained a great importance with regard to the destruction of environment for the existence of living things, especially with regard to the influence of waste water on marine products industry and agricultural industry, and with regard to the reuse of water. A process for treating waste water which is economical and which permits a high purification of waste water has thus been demanded. As a powerful process which fulfills such demand, there is a process for treating waste water in which contaminations in waste water are decomposed by microorganisms so that the contaminations are removed. That is, when organic substances are contained in waste water and if there are adequate conditions for organic substances as to temperature, nourishment, dissolved oxygen and the like, propagation of aerobic microorganisms is resulted so that the aerobic microorganisms decompose the organic substances into injurious substances such as carbon dioxide, water and the like by enzyme reactions and new cells of microorganisms are synthesized by utilizing energy produced by such decomposing reaction, and a process for treating waste water which utilizes such action of aerobic microorganisms is called or termed as "bio-oxidation proceess". When such bio-oxidation process is carried out, there occurs the auto-oxidation of a part of the organic substances in waste water by using dissolved oxygen in the water so that organic substances are decomposed and removed by the action of microorganisms and also by such auto-oxidation. Further, when dissolved oxygen in concerned waste water has been exhausted by aerobic microorganisms, there occurs propagation of anaerobic microorganisms in place of aerobic microorganisms and such anaerobic microorganisms exhaust oxygen contained in organic substances for the living of the microorganisms and decompose organic substances by various enzymes secreted by the anaerobic microogranisms so that organic substances are finally decomposed into carbon dioxide, methane, hydrogen sulfide, ammonia and the like. A process for treating waste water which utilizes such action of anaerobic microorganisms is called or termed as "anaerobic decomposition".

Among these two kinds of processes for treating water water which utilize microorganisms, the bio-oxidation process utilizing aerobic microorganisms is particularly spread. As typical embodical processes for such bio-oxidation process, there are following three processes. The first process is "activated sludge process" in which waste water having been treated in a primary settling tank is recirculated in and through an aeration tank under aeration so that flock-like aerobic microorganisms are propagated in the aeration tank, whereby numerous flocks of the aerobic microorganisms absorb or biosorb organic substances in waste water which are then decomposed by the aerobic microorganisms in the flocks. In carrying out this activated sludge procss, waste water to be treated is stayed in the aeration tank for a suitable period of time and then is released after a settling treatment in a final settling tank and a part of settled or sedimentated sludge in the final settling tank is returned to the aeration tank as activated sludge for supplying aerobic microorganisms to the aeration tank. The second process belonging to the bio-oxidation process is "sprinkling or trickling filter process" in which waste water to be treated is sprinkled onto a filter bed formed with a layer of 2 to 3 meters in height of crushed stone blocks of 2.5 to 8 centimeters in size and treated water is discharged from the bottom of the filter bed. In this case, aerobic microorganisms are propagated in a film-like fashion on the surface of the crushed stone blocks and such aerobic microorganisms decompose organic substances in waste water which come into contact with the films of the microorganisms. In carrying out this sprinking filter process, a part of treated water which is subjected to a final settling treatment is often recirculated to the filter bed for enhancing BOD (Biochemical Oxygen Demand) loading. The third process belonging to the bio-oxidation process may be called or termed as "submerged packing process" in which a fixed layer of various packings are submerged in waste water in a treating tank and waste water is recirculated in the treating tank through the layer of the packings under aeration so that aerobic microorganisms generating on the surface of individual packings as films decompose organic substances coming into contact with the films of the aerobic microorganisms. As packings for this submerged packing process, there have been proposed block-like packings, a bundle of long straight tubes in which a number of long straight tubes each having, for example, hexagonal cross-section, are in parallel arranged so as to make a long bundle of the tubes, packings in the form of bamboo twigs, Rasching ring-like packings which are arranged at random and the like.

Turning to the consideration of the activated sludge process and the sprinkling filter process, thses processes have the following disadvantages, respectively. First, in carrying out the activated sludge process, the flocks of aerobic microorganisms are recirculated in the aeration tank together with the recirculation of waste water with such a rate substantially the same as the flow rate of waste water so that waste water surrounding each flock of the microorganisms is seldom replaced, that means contact between the microorganisms and the contaminating organic substances is poor. Further, in carrying out the activated sludge process, so-called sludge conrol is very hard. That is, for the purpose of carrying out the activated sludge process with a high efficiency, it is required to control the return rate of activated sludge and the like by watching the sedimentation ability of sludge, mean stay period of time of waste water in the aeration tank, sludge concentration and the like, and this control is termed as sludge control. In practice, this sludge control is made by employing as characteristics or indexs mixed liquor suspended solid concentration, sludge volume index, sludge density index, sludge age and the like. However, these indexes or characteristics can seldom be measured or detected with a reliable manner and also it is not necessarily easy to determine an optimum return rate of activated sludge and the like from a combination of such numerous indexes or characteristics. Referring to the spraying filter process, although this process has an advantage that operation cost is smaller than that of the activated sludge process, the spraying filter process requires a large space and cost for installation of an apparatus for the process and further, in carrying out the process, an offensive odor and insects are generated and loss of water head is large.

Turning to a consideration of the submerged packing process, bio-oxidation is made in this process in such a state that microorganisms are always adhering to the packings so that control corresponding to the sludge control in the activated sludge process is very easy. Further, in carrying out the submerged packing process, concentration of suspended solid in treated water from the treating tank is very small so that said treated water can be discharged immediately without being subjected to a final settling, and it is easy to obtain treated water having low concentration of contaminations by setting the stay period of time of waste water in the treating tank adequately. As factors or demands for carrying out this submerged packing process with a high efficiency, the following may be pointed out: (1) First, water to be treated should flow in the treating tank, especially through the layer of packings, uniformly without the presence of staying portions, that means that waste water coming into contact with the surface of the individual packings is always replaced with a substantially same rate throughout the layer of the packings so that all of the packings always act uniformly and effectively. (2) Second, an adequate turbulency or disturbance should be present in waste water flowing through the layer of the packings so that there exists a condition which is suitable for the propagation of microorganisms. That is, as to the flow of waste water in the layer of the packings water around the individual packings does not move substantially due to the resistance against flow given by the surface of the packings and viscosity of water resulting in formation of so-called laminar sub-layer, and organic substances which are nourishments for microorganisms diffuse through the laminar sub-layer from the outer flow of said sub-layer to approach to the flock-like microorganism on the packings so that the microorganisms are nourished resulting in propagation of the microorganisms. Accordingly, when a turbulency or disturbance of flow which is not so strong to scrape off the microorganisms from the surface of the packings is given to the flow of waste water thereby the thickness of laminar sub-layer being reduced, organic substances easily approach to the microorganisms on the packings as nourishments of said microorganisms so that propagation of the microorganisms is enhanced. An adequate turbulency or disturbance of water flowing through the layer of the packings is, therefore, an important factor. (3) Third, there should be a circumstance which permits the existence or generation of various kinds of microorganisms. That is, as well known, one kind of microorganism can exist or generate at a condition and also one kind of microorganism acts as a decomposer of one kind of substance. Accordingly, if there are various conditions at various locations in a a layer of the packings, there are generated various kinds of microorganisms which decompose various kinds of contaminating substances. (4) Fourth, there should be large amounts of flocks of microorganisms in the unit volume of the layer of packings so that the microorganisms acting on organic substances in waste water are large in numbers. (5) Fifth, contact area between microorganisms and waste water shoule be large and should be increased as the microorganisms propagate. (6) Finally, a suitable packed condition in a layer of packings should be able to be set under consideration on contaminated degree of waste water to be treated and desired purification degree of treated water and with setting the height or length of the layer of packings in the direction of flow of waste suitably under consideration on the decrease of dissolved oxygen which decreases along the direction of flow of waste water.

The submerged packing process according to the prior art, however, seldom fulfills these factors or demands due to the foregoing packings so that the process does not achieve a treatment of waste water with a high efficiency. That is, as to block-like packings first, the amounts or area of the packings which can be packed in the unit volume of a layer of the packings are small so that the volume of the layer of the packings is increased resulting in lowering of purifying efficiency and in increasing of space and cost for installation. Further, loss of water head is large in this block-like packings. Second, when Raschig ring-like packings are employed, the packings which are arranged at random orientate perpendicular, diagonally and in parallel to the flow of waste water so that there is no uniformity throughout the layer of the packings resulting in non-uniformity of flow distribution of waste water through the layer of the packings, that means the lack of the aforestated first factor or demand. Further, sludge easily accumulated in the packings which are oriented in parallel to the flow of waste water is apt to putrefy. Furthermore, flocks of microorganisms adhering on the inner face of the ring packings reduce the contact area between the microorganisms and waste water as the flocks grow. Third, when packings in the form of bamboo twigs are employed, there is no uniformity in the flow distribution of waste water through a layer of the packings resulting the lack of the aforestated first factor or damand and further the amounts of microorganisms capable of being held on the surface of the packings are very samll so that treatment with a high efficiency cannot be expected.

Turning to a consideration of the bundle of long straight tubes which has been developed recently, it is hard to uniformity inlet fluid pressure throughout the numerous individual tubes so that flow rates in individual tubes, vary to a pretty large extent resulting in some lack of the aforestated first factor or demand. Further, a serious disadvantage of this packing consists in the fact that the flow of waste water through each long straight tube takes so-called Poiseuille flow (a flow in which Poiseuille's law is satisfied) except for the neighborhood of the inlet and outlet of the tube, that means the thickness of laminar sub-layer is large so that there is no turbulency or disturbance of flow which is preferred for the propagation of microorganisms. Furthermore, such Poiseuille flow gives few conditions for the existence of microorganisms so that few kinds of microorganisms may exist or generate resulting in the lack of the aforestated third factor or demand. In addition, flocks of microorganisms adhering on the inner circumference of each straight tube reduce the effective inner diameter or size of the tube as the flocks grow so that contact area between the microorganisms and waste water is reduced.

Although the state of art regarding the bio-oxidation process is recited in the foregoing, the anaerobic decomposition process has similar problems to be solved because the decomposition itself of organic substances in waste water is achieved by the contact of the organic substances with microorganisms so that contact between the organic substances and anaerobic microorganisms should be enhanced.

Accordingly, a primary object of the present invention is to provide a novel apparatus for treating waste water which solves the foregoing problems accompanying with the processes according to the prior art and which permits a treatment of waste water with a high efficiency.

Another object of the present invention is to provide a novel apparatus for treating waste water which can be installed compactly and with a low cost.

Still another object of the present invention is to provide a novel apparatus for treating waste water which is easy in control in carrying out a treatment of waste water.

DESCRIPTION OF THE DRAWING

Other objects and advantages of the present invention will become more readily apparent as the specification is considered in conjunction with the accompanying drawings, in which:

FIG. 10 is a horizontal sectional view of another embodiment of a treating tank;

FIG. 11 is a vertical sectional view of a further embodiment of a treating tank;

FIG. 12 is a schematic graph showing relations between the width $a$ of crossing passages between adjacent two tube members in a bundle of tubes employed in the apparatus according to the present invention;

FIG. 13 is a perspective view of a part of another embodiment of a bundle of straight tubes employed in the apparatus according to the present invention;

FIG. 14 is a horizontal sectional view of the bundle shown in FIG. 13 taken along line XIV—XIV of FIG. 13; and FIG. 15 is a graph showing rate of reduction of COD which was obtained from a comparison test carried out by using an apparatus according to the present invention and an apparatus according to the prior art.

Referring now to the drawings in which like numerals designate like parts throughout the several views thereof, there is shown an embodiment of the apparatus for treating waste water according to the present invention in FIGS. 1 to 7. The apparatus shown is constructed so that it has a relatively low capacity of treating waste water such as sewage. As shown in FIG. 1, the apparatus has three treating tanks, namely first, second and third treating tanks 20, 21 and 22 which are in series arranged. In the treating tanks 20, 21 and 22 are arranged respectively bundles 23, 24 and 25 of a number of straight tubes which will fully be detailed later. In the treating tanks are further arranged air-jetting nozzles 26, 27 and 28 which act as aeration means so as to enrich dissolved oxygen in water in the tanks 20, 21 and 22 and also act as recirculating means so as to recirculate water in the tanks along the direction shown with arrows in FIG. 1. A primary settling tank 29 is provided for removing relatively heavier sludge from sewage or the like to be treated by settlement or sedimentation. Water in the settling tank 29 is charged to the first treating tank 20 by a pump 30 through a conduit 31. Water in the first treating tank 20 is then charged to the second treating tank 21 by overflow above a partition 32 between the first tank 20 and the second tank 21. Similarly, water in the second treating tank 21 is then charged to the third treating tank 22 by overflow above a partition 33 between the second tank 21 and the third tank 22. Treated water is discharged from the third treating tank 22 through a conduit 34.

In the first treating tank 20 of concrete is arranged a frame 35 of concrete having a rectangular cross-section so that a recirculating passage 36 and a discharge passage 37 are formed outside the frame 35 in the tank 20, as shown in FIG. 2. The frame 35 is supported by the tank 20 through supporting arms 38 projected from the frame 35 and supporting steps 39 formed on the inner walls of the tank 20. The lower end of the frame 35 is projected inwardly so that a receiving step 40 having a rectangular cross-section is formed. As shown in FIGS. 2 to 4, the aforestated bundle 23 is arranged in the frame 35 so that the bundle 23 is received by the receiving step 40. On the bundle 23 is placed a retaining means 41 having a rectangular opening 41a which means is secured to the frame 35 at 42.

As shown in FIG. 5, the bundle 23 is composed of a number of straight tubes 43 which are in parallel arranged to a bundle and are connected to the adjacent tubes 43 by common walls for the tubes. Further, as shown in FIG. 5, the bundle 23 of the straight tubes 43 is provided with intermittently arranged cut-off portions or crossing passages 44 each having a certain distance $a$ along the bundle 23. The bundle 23 is thus divided into a plurality of bundle members or sections 45 which are in series arranged along the bundle with intervals $a$ therebetween. Between two adjacent bundle members 45 are arranged a plurality of spacing devices 46 of a synthetic resin each of which has a cylindrical network construction as shown in FIG. 6. The spacing devices 46 forming each vertical row may be connected to one another by a wire or the like. As shown in FIG. 7, each tube or tube section in each of the bundle members 45 has a hexagonal cross-section. The tubes 43 are made of a material which has a resistance against hydraulic decomposition, biochemical decomposition and corrosion and which is not harmful to the action of microorganisms. An example of such material is a synthetic resin such as polyethylene, polypropyrene, polyamide, polyvinyl chloride and the like. Each of the tubes 43 has an opening of, for example, 0.5 to 1.5 square centimeters, Each of the bundle members 45 has a height of, for example, 5 to 15 centimeters. The height of each bundle member 45 is determined so small that Poiseuille flow (a flow which satisfies Poiseuille law) is not substantially formed in each of the tubes 43 due to inlet the outlet disturbance of flow when water flows through the tube. The interval a between each two adjacent bundle members 45 is, for example, 1.5 to 5 centimeters.

Figure 3:
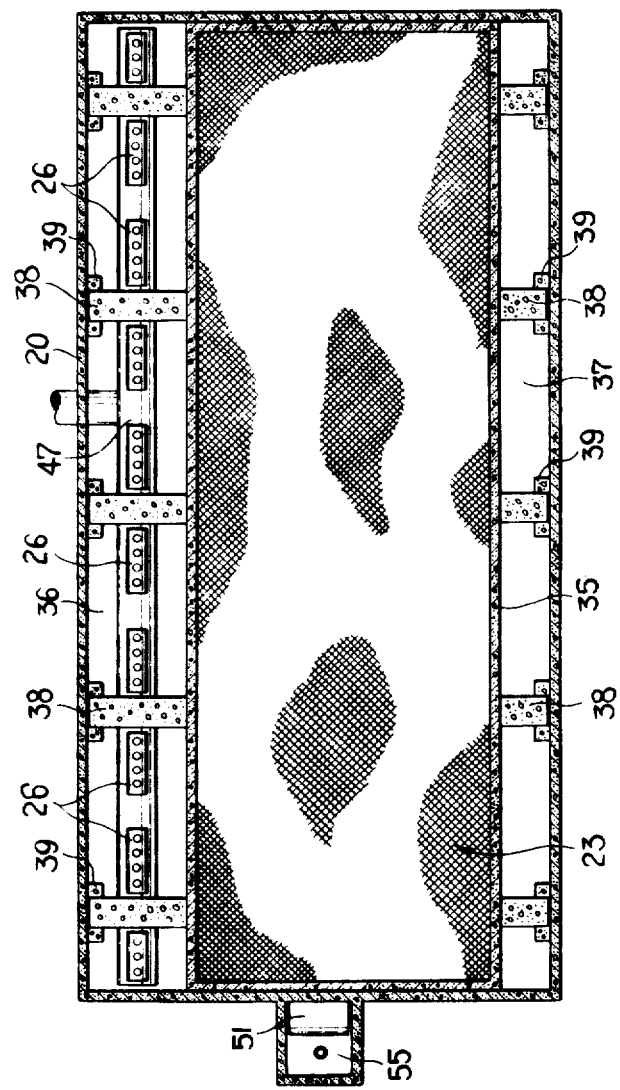
FIG. 3 is a horizontal sectional view of the treating tank taken along line III—III of FIG. 2.

The air-jetting nozzles 26 are arranged at the bottom of the recirculating passage 36 with equal intervals therebetween, as shown in FIG. 3. The nozzles 26 are communicated to a common pipe 47 for supplying air and the pipe is in turn connected to a blower (not shown). Below the bundle 23 are provided a plurality of another air-jetting nozzles 48 communicated to a common supply conduit 49 which is connected to another blower or a compressor (also not shown). The air-jetting nozzles 48 are intermittently operated so that air is forcedly flowed through the bundle 23 in the direction reverse to the flow of water for removing sludge from the openings of tubes 43.

Figure 4:
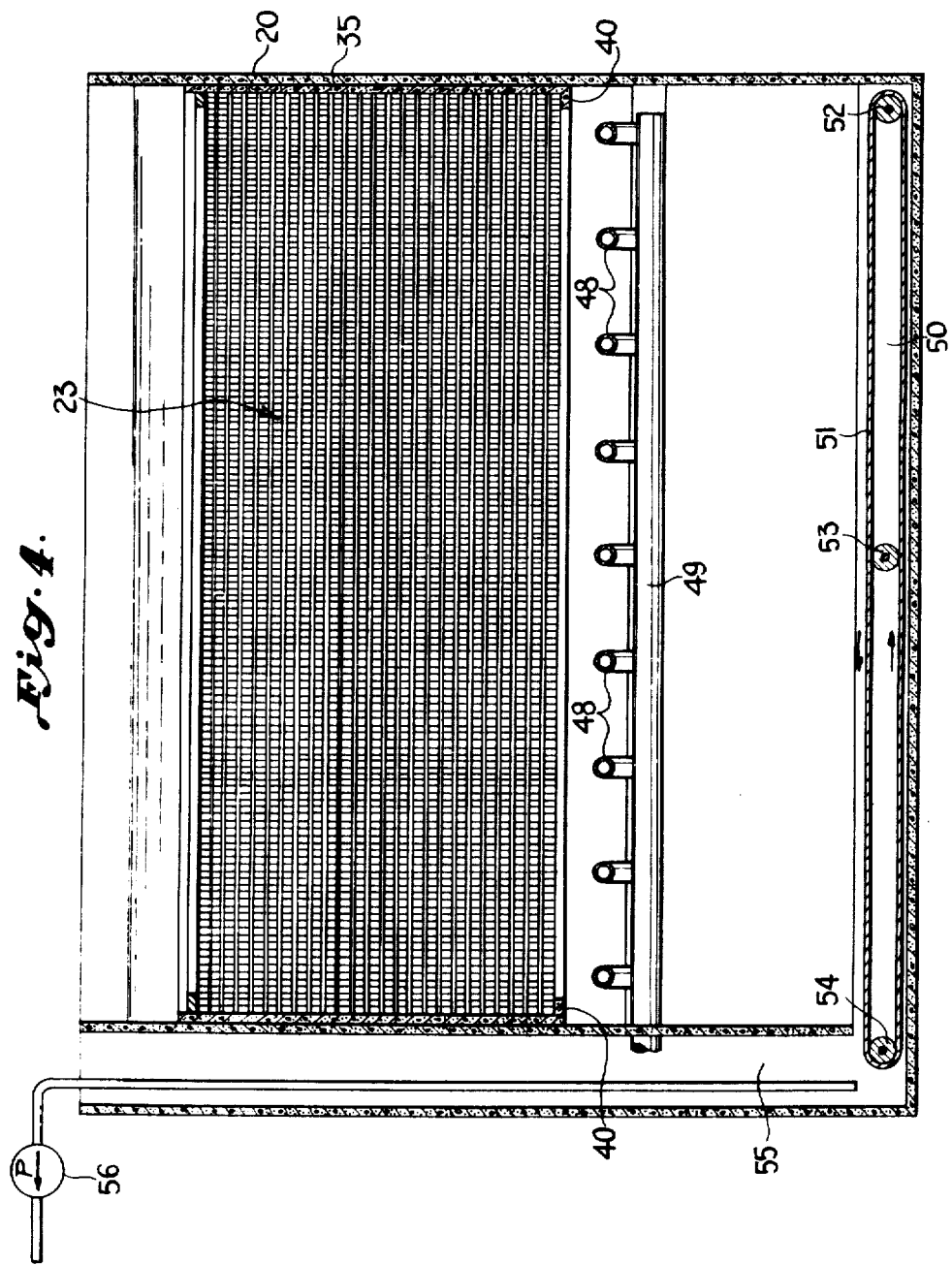
FIG. 4 is a vertical sectional view of the treating tank taken along line IV—IV of FIG. 2.
Figure 5:
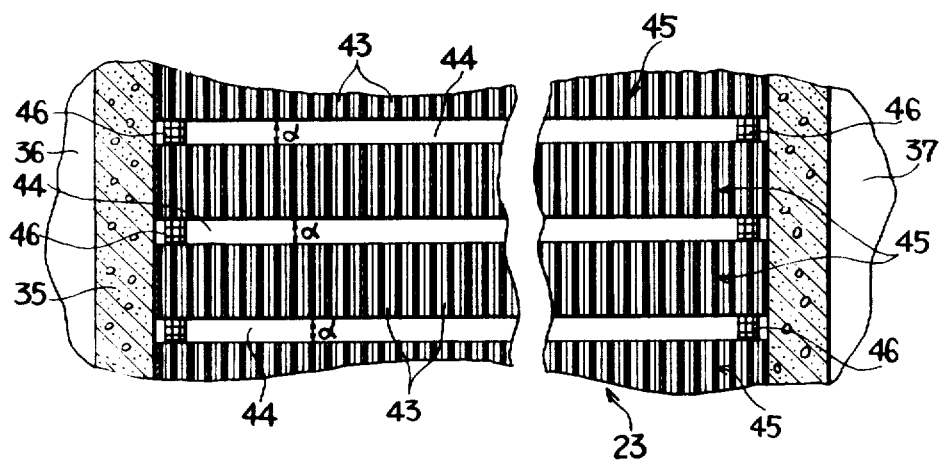
FIG. 5 is an enlarged vertical sectional view, partially cut away, of a part of a bundle of straight tubes and a frame therefor employed in the treating tank shown in FIG. 2.
Figure 7:
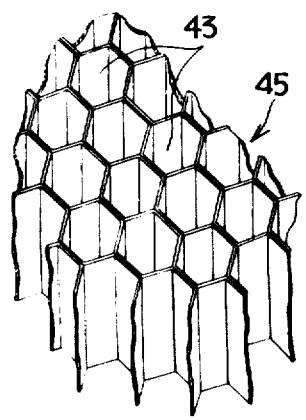
FIG. 7 is an enlarged perspective view of a part of a bundle member composing the bundle shown in FIG. 5.
Figure 6:
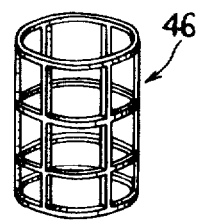
FIG. 6 is an enlarged perspective view of a spacing device employed in the treating tank shown in FIG. 2.

The bottom of the first treating tank 20 is inclined toward a center groove 50 and an endless conveyor belt 51 is provided in the groove 50 for discharging sludge which sedimentates on the bottom. The conveyor belt 51 is supported by rollers 52, 53 and 54 and is driven to travel by the roller 54 intermittently or continuously in a direction shown with arrows in FIG. 4. The conveyor belt 51 discharges sludge thereon at a discharge chamber 55 beside the tank 20. Sludge in the discharge chamber 55 is discharged intermittently by a discharge pump 56.

Figure 2:
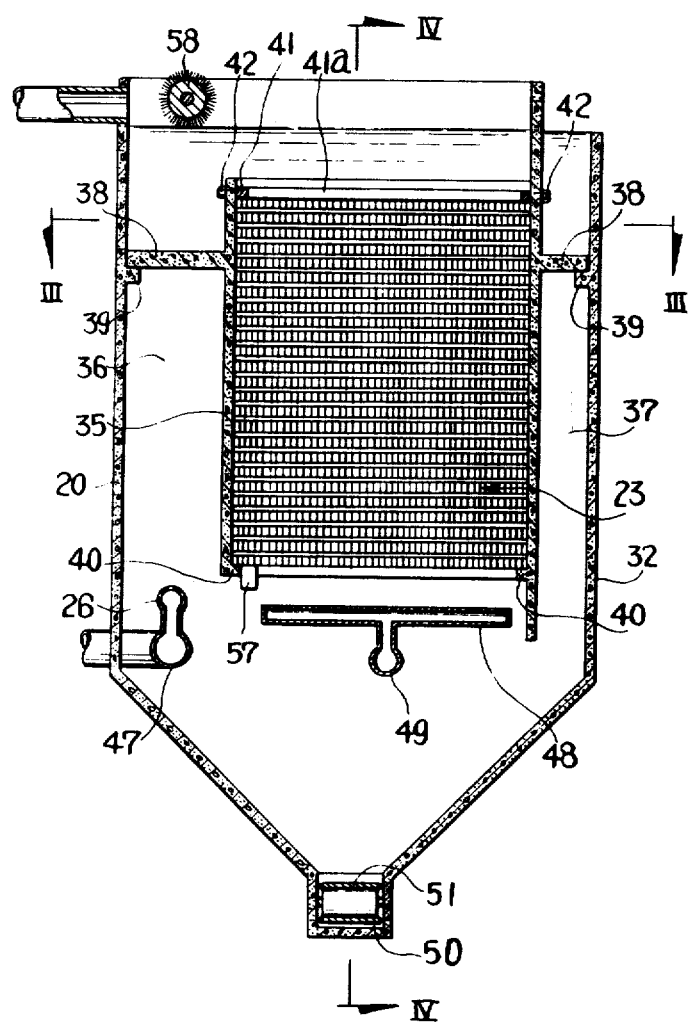
FIG. 2 is an enlarged vertical sectional view of a treating tank employed in the apparatus shown in FIG. 1.

As shown in FIG. 2, a flow meter 57 is arranged at the bottom of the bundle 23 at the side of the recirculating passage 36 for detecting choking or clogging of the bundle 23 with sludge by sensing the flow rate of water leaving the bundle 23. The flow meter 57 may be constructed with a fixed contact and a spring-biased movable contact which is forced to move by the kinetic pressure of water so that the meter 52 electrically detects the choking or clogging of the bundle 23 by the OFF- or ON-state between the contacts. Furthermore, a foam-eliminating means having a brush shaft 58 is provided above the recirculating passage 36. The brash shaft 58 may be stationary or be rotated.

Figure 1:
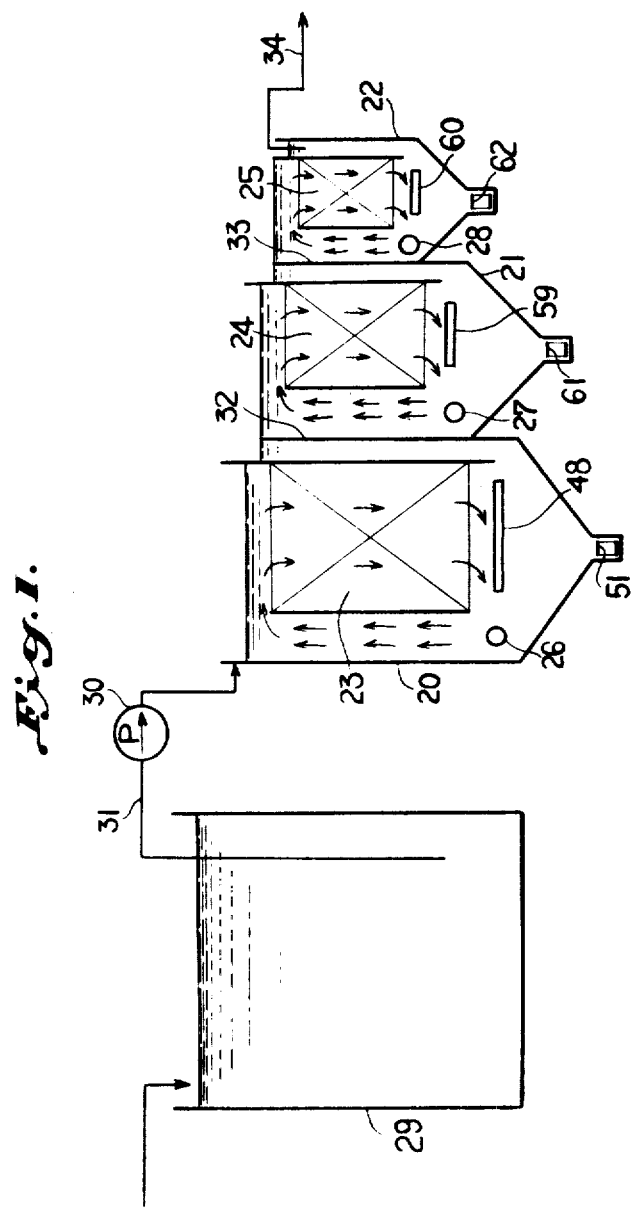
FIG. 1 is a schematic vertical sectional view of an embodiment of the apparatus for treating waste water according to the present invention.

The other treating tanks 21 and 22 are similrly constructed. In FIG. 1, air-jetting nozzles acting similarly as the aforestated air-jetting nozzles 48 in the second and third treating tanks 21 and 22 are designated by numerals 59 and 60 respectively, and conveyor belts acting similarly as the aforestated conveyor belt 51 in the second and third treating tanks 21 and 22 are designated by numerals 61 and 62 respectively.

The apparatus shown in FIGS. 1 to 7 operates as follows: Waste water such as sewage is charged through the conduit 31 into the first treating tank 20. Water treated in the first treating tank 20 is charged by overflow into the second treating tank 21 and water treated in the second treating tank 21 is charged by overflow into the third treating tank 22.

Water charged in the first treating tank 21 is recirculated by the aid of air jetted from the air-jetting nozzles 26 through the tank 20 so that the water passes through the recirculating passage 36 and through the bundle 23 successively. Simultaneously, dissolved oxygen in waste water is enriched by the air supplied by the air-jetting nozzles 26. Air from the air-jetting nozzles 26 amounts, for example, 3 liters per minute and flow rate of water through the bundle 23 is, for example, 1 to 4 centimeters per second.

In the bundle 23, aerobic microorganisms existing in waste water adhere onto each straight tube 43 and propagate by uptaking organic substances in the water as nourishments therefor. Flocks of the microorganisms are thus formed on the surface of the straight tubes 43. These flocks of the microorganisms further uptake organic substances as the recirculation of water proceeds so that waste water is purified gradually. As will be explained later in great detail, propagation of microorganisms in the bundle 23 is very vigorous throughout the bundle and flocks of the microorganisms can easily uptake organic substances in waste water so that removal of organic substances from waste water proceeds very vigorously and promptly.

Foams generated above the recirculating passage 36 run against brushes on the brush shaat 58 so that the foams are eliminated easily. Such foams are generated very vigorously when water to be treated contains some amount of detergent. The foam-eliminating means comprising the brush is very simple in construction. Sludge having settled or sedimentated on the bottom of the tank 20 moves along the inclined bottom on the conveyor belt 51 arranged in the groove 50 and is discharged into the discharge chamber 55 by driving the belt 51 intermittently or continuously. Thus discharged sludge is pumped out from the chamber 55 intermittently by the discharge pump 56. Further, when the flow meter 57 detects the choking or clogging of the bundle 23 by sludge, the supply of air to the pipe 47 communicated to the air-jetting nozzles 26 is stopped and then air is supplied to the pipe 49 so as to jet the air from the air-jetting nozzles 48. In this case, the air flows through the bundle 23 upwardly so that sludge clogging the bundle 23 is removed. In practise, such choking or clogging of the bundle 23 is seldom caused.

In each of the second and third treating tanks 21 and 22, a similar operation is obtained. Treated water discharged from the first tank 20 is then treated in the second tank and treated water discharged from the second tank 21 is then treated in the third tank 22. Because water having a lower content of contaminations may be treated with a tank having low capacity, the treating tanks of lower reach are made smaller than the treating tanks of upper reach, as shown in FIG. 1.

Figure 8:
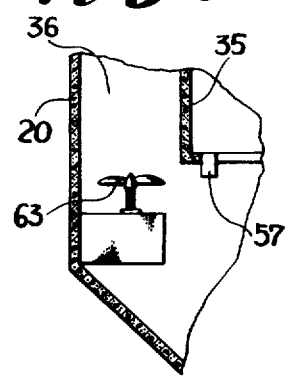
FIG. 8 is a vertical sectional view of a part of another embodiment of a treating tank.

In FIG. 8, there is shown another embodiment of recirculating means comprising a plurality of propellers 63 which forcedly recirculate waste water in the tank 20. Such separate recirculating means may be provided if required rate of flow or recirculation is not obtained only by the foregoing aeration means 26. Further, when dissolved oxygen is previously enriched in an aeration tank (not shown) arranged before the treating tank 20, the foregoing aeration means 26 may be omitted as shown in FIG. 8.

Figure 9:
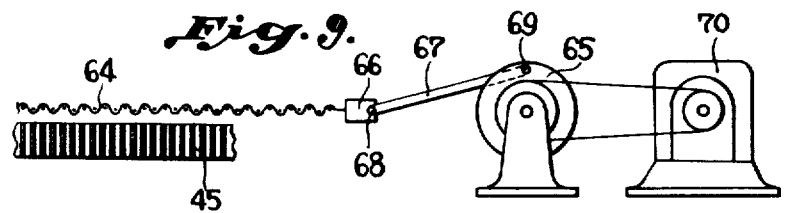
FIG. 9 is a schematic view, partially in section and partially cut away, of an embodiment of a scraping means for removing sludge.

FIG. 9 shows a scraping device which removes sludge from the upper edge of the uppermost bundle member 45 on which sludge adheres pretty easily. The scraping device comprises a scraping net 64 which is connected to a rotor 65 through a bar 66 fixedly secured to the end of the net 64, an arm 67 bridged between the rotor 65 and the bar 66, and pivot pins 68 and 69 at the ends of the arm 67. The rotor 65 is driven to rotate by a prime-mover 70. Because the pivot pin 69 is placed at an eccentric location of the rotor 65, the scraping net 64 is reciprocated on the bundle member 45 as the rotor 65 rotates so that sludge on the upper edge of the member 45 is scraped off. The scraping device is operated intermittently. This construction od the scraping device is simple in construction.

In FIG. 10, there is shown an embodiment of a treating tank 71 for a treatment of a large scale. In the tank 71 are arranged a plurality of bundles 72 each of which comprises a plurality of spaced bundle members of straight tubes (not shown). The bundles 72 are in parallel arranged in the tank 71 with remaining a passage 73 between each two adjacent bundles 72. The treating tank 71 has an inlet 74 for waste water to be treated and an outlet 75 for treated water. A passage 76 for waste water which is communicated to the inlet 74 is provided at one side of the row of the bundles 72 and a passage 77 for treated water which is communicated to the outlet 75 is provided at the other side of the row of the bundles 72. The passage 76 is communicated to every other passage 73 between two adjacent bundles 72 through a flow distributor 78 consisting of a perforated plate. The other passages 73 between two adjacent bundles 72 are shut off from the passage 76 for waste water by fixedly provided shutting walls 79. Further, the passage 77 for treated water is communicated to every other passage 73 which is shut off from the passage 76 for waste water. The other passages 73 between two adjacent bundles 72 are shut off from the passage 77 for treated water by fixedly provided shutting walls 80.

In the treating tank 71 shown in FIG. 10, water flows in the directions shown with arrows in FIG. 10 and, during such flow, waste water necessarily flows through any of the bundles 72 so that treated water is discharged from the outlet 75. The arrangement shown in FIG. 10 permits a compact installation of a plant capable of treating large amounts of waste water. In installing a practical plant, a plurality of similarly constructed treating tanks are connected in series.

FIG. 11 shows another embodiment of a treating tank 171 for a treatment of a large scale. The arrangement shown in FIG. 11 is fashioned so that the horizontal arrangement shown in FIG. 10 is changed into a vertical arrangement. Further explanations on this arrangement shown in FIG. 11 will thus be unnecessary and like parts are designated in FIG. 11 by numerals larger by one hundred than those for the parts shown in FIG. 10.

Although several preferred embodiments are illustrated in the drawings and have been explained hereinbefore, there are many other variations, modifications and extensions. For example, in place of the detection by the aforestated flow meter 57, a detection of choking or clogging of the bundle of straight tubes may be made by sensing the difference of water head between the inlet and outlet of a treating tank. Further, in place of the aforestated air-jetting, clogging of the bundle of straight tubes may be removed by forcedly flowing waste water through the bundle in a direction reverse to the direction of flow during treatment by a pump, propellers or the like. Furthermore, there may be provided above the bundle of straight tubes a flow distributor consisting of a perforated plate which distributes waste water uniformly over the bundle of straight tubes in the direction across the bundle. Another variation is illustrated in FIGS. 13 and 14 and will be detailed later.

Having now explained the apparatus for treating waste water according to the present invention by referring to several embodical features, purification of waste water is achieved in the following manner in the apparatus according to the present invention.

First, as to the flow state of waste water through the bundle of a number of straight tubes, a certain interval or crossing passage 44 which is placed between each two adjacent bundle members 45 plays a role of a uniform flow distributor or rectifier for the next bundle member 45 because water having flowed out from the prior-stage bundle member 45 is distributed uniformly in the direction across the bundle or across the flow direction of water so that approximately uniformly distributed flow is obtained throughout entire cross-section of the bundle of the straight tubes. This means that waste water coming into contact with the inner surface of each tube 43 composing each bundle member 45 is always replaced approximately uniformly throughout the bundle of straight tubes. All of the flock-like microorganisms on the inner surface of the tubes 43 thus always act effectively and uniformly on waste water or organic substances therein. In addition, even if some tubes 43 of a bundle member 45 are choked or clogged by sludge, the inlet flow to the next bundle 45 is uniform owing to the presence of an interval or crossing passage 44 between the bundle members so that there are no staying portions of flow substantially. Accordingly, ratio of the cross-section of the bundle of straight tubes to the cross-section of non-packing space or recirculating passage can be enlarged without substantial destruction of uniform flow distribution so that the packed portion or the bundle of tubes may be large in a treating tank for enhancing the treatment.

Second, as to the turbulency or disturbance of flow of waste water, length or height of each of the bundle sections or members 45 is determined so small that no Poiseuille flow is substantially formed in each of the tubes 43 due to disturbance of flow which is given due to flowing-in of water to the tube 43 and flowing-out of water from the tube 43. That is, flowing-in of water into each tube 43 forms a flow-disturbed region in the tube and flowing-out of water from the tube 43 forms another flow-distributed region in the tube, and the length of the tube is so determined according to the present invention that said two kinds of flow-disturbed regions occupy almost all of the inner space in the tube 43. Accordingly, an adequate turbulency or disturbance is given to waste when the water flows through each bundle member 45 so that thickness of laminar sub-layer on the inner surface of each tube 43 is very small. Therefore, organic substances in waste water easily approach to the flock-like microorganisms adhering on the inner surface of the tubes so that the microorganisms uptake the organic substances easily as nourishments resulting in a vigorous propagation of the microorganisms. In addition, such turbulency or disturbance of flow of waste water can easily be set to such extent by setting the flow rate of waste water suitably small so that scrapping-off of the microorganisms from the inner surface of the tubes 43 is not caused. That is, in the apparatus according to the present invention, a flow similar to so-called turbulent flow is obtained not by increasing the flow rate of waste water but by a geometrical consideration so that flocks of microorganisms are prevented from scraping-off.

Third, disturbance of turbulency of flow is not uniform in a short tube 43 along the tube because such disturbance or turbulency is caused by flowing-in and flowing-out of water and the disturbance of flow is more vigorous at the end portions of the space in the tube than at the middle portions of said space. Such non-uniformity of turbulency or disturbance of flow in the tubes 43 permits existence of various kinds of microorganisms. The apparatus according to the present invention thus permits removal of various kinds of contaminating substances.

Fourth, as to the amounts of microorganism-flocks and contact area between the focks and waste water the aforestated vigorous propagation due to flow turbulency and the aforestated uniform distribution of flow of waste water throughout the cross-section of the bundle 23 cause a very vigorous propagation of microorgaisms throughout the bundle 23 so that there generates in the bundle 23 of straight tubes large amounts of microorganisms. The flocks of microorganisms adhere more largely at the ends of each tube 43 than at the middle portions of the tube 43. The flocks adhering to the ends of the tube 43 has a large contact area with water because such flocks project from the tube 43 upwardly and downwardly so that the flocks come into contact with water in the crossing passages 44. Although the flocks on the inner surface of the tube 43 narrow the surface or contact area, the aforestated turbulency of flow promotes the contact between the flocks and water. Thus, in the apparatus according to the present invention, large amounts of flock-like microorganisms act on organic substances in waste water very effectively.

Finally, a setting of conditions of the apparatus under consideration on a desired treatement can be made easily in designing an embodical apparatus according to the present invention. That is, conditions for a desired treatment can be set by selecting or setting size of opening of each tube composing the bundle 23, length or height of each bundle member 45, interval or width of each crossing passage 44 and the like according to concerned treatment under consideration on the successive decrease of dissolved oxygen along the direction of flow of waste water. For clarifying such setting of conditions, relations between interval between each two adjacent bundle members 45 or width α of each crossing passage 44 and the concentration of BOD (Biochemical Oxygen Demand) are shown in FIG. 12. The curves I, II and III were obtained from tests carried out by using three kinds of test plants and by changing the interval α. From FIG. 12, it can be seen that an optimum interval α is present in each case.

As can be understood from the foregoing, the apparatus for treating waste water according to the present invention fulfills or satisfies all of the factors or demands (1) to (6) stated before in relation to the submerged packing process according to the prior art. In addition to this, the apparatus according to the present invention still has the advantages of the submerged packing process according to the prior art. That is, the apparatus according to the present invention requires no complicated control such as sludge control in the activated sludge process wherein rate of sludge return is determined by watching the state of treatment of waste water so that suitable amounts of sludge are returned to the areation tank from the final settling tank at suitable points of time. Further, water treated by the apparatus according to the present invention contains little amount of suspended solids so that the treated water can be discharged immediately without subjecting to a final settling. Furthermore, by setting stay period of time of water to be treated in a treating tank according to a required treatment, treated water having a very low concentration of contaminations may be obtained. Of course, no offensive odor or insects generate in using the apparatus according to the present invention.

From tests carried out by using test plants it has been found that there may exist in treating sewage under a areobic condition various kinds of organisms, namely Schizomycetes such as *Zooglea sp.*; Ciliates such as *Volticella sp.*, *Litonotus sp.*, *Stenter sp.* and *Stylonychia sp.*; Flagellata such as *Monas sp.*; Rhizopoda such as *Euglypha sp.*, *Arcella sp.*, *Leptochlamys sp.* and *Difflugia sp.*; Rotifers such *Trichocerca sp.* and *Colurella sp.*; Bacillariophyceae such as *Melosira sp.* and *Nitzschia sp.*; Nematoda; Oligochaeta and Copepoda.

For the purpose of better understanding of the advantages obtained by the present invention, some results of further tests will be described hereinafter.

TEST I

City sewage of Takamatsu Sewage Treatment Plant, Takamatsu, Japan was treated. A test plant was constructed similarly to the first treating tank 20 shown in FIGS. 1 to 4. The height of the bundle 23 of tubes of polyethylene was about one meter and each of the tubes 43 composing the bundle had a hexagonal cross-section having about 0.7 square centimeters. The bundle 23 comprised a plurality of bundle members 45 each having a length or height of about 15 centimeters. The interval between each two adjacent bundle members 45, namely the width of each crossing passage 44 was about 2 centimeters. For a purpose of comparison with the submerged packing process employing a bundle of a number of straight tubes as packing according to the prior art, a bundle of a number of straight tubes which bundle was similar in shape and in size to the above bundle 23 according to the present invention but which was not provided with the crossing passages 44 was arranged in an another treating tank which was similar in shape and in size to the treating tank for the test plant.

Quantity of flow of waste water was about 14 liters per hour. Areation air was supplied with a rate of about 2.8 liters per minute. Temperature of waste water was ranged between 12 and 15° C. This test was carried out for eight days. Treated water from each of the tanks was sampled intermittently and BOD and COD (Chemical Oxygen Demand) were measured by standard methods of the Japan Sewer Associate. A number of measured values were averaged. The results of the test were listed in TABLE I.

TABLE I

| Sample | Waste water (Sewage) | Treated water from No. 1 treating tank* | Treated water from No. 2 treating tank** |
|---|---|---|---|
| BOD (p.p.m.) | 35 | 14.8 | 22.8 |
| COD (p.p.m.) | 45 | 21.3 | 24.5 |

*In No. 1 treating tank was arranged the bundle having the crossing passages according to the present invention.
**In No. 2 treating tank was arranged the bundle having no crossing passages according to the prior art.

From TABLE I, it can be understood that the apparatus according to the present invention is more effective in removing organic substances than the apparatus for carrying out the submerged packing process according to the prior art in which a bundle of a number of long straight tubes is employed as a packing.

TEST II

By using the two kinds of treating tanks used in TEST I, reduction of Coliform Organisms of Coliform group of bacteria was tested. Quantity of flow of waste water or sewage similar to the one treated in TEST I was about 8.0 liters per hour and rate of the supply of areation air was about 3.0 liters per minute. Temperature of water was about 13° C. Numbers of Coliform Organisms in the unit volume of water were measured by the Defoxycholate Culture method. The results of the test are listed in TABLE II.

TABLE II

| Sample | Waste water | Treated water from No. 1 treating tank* | Treated water from No. 2 treating tank* |
|---|---|---|---|
| Average Numbers of Coliform Organisms per milli-liter water | 4300 | 257 | 401 |

*see the Note for TABLE I.

From TABLE II, it can be understood that the apparatus according to the present invention is more effective in removing Coliform Organisms than the apparatus for carrying out the submerged packing process according to the prior art in which a bundle of a number of long straight tubes is employed as a packing.

TEST III

By using the two kinds of treating tanks used in TEST I, reduction of suspended solids was tested. Quantity of flow of waste water or sewage similar to the one treated in TEST I was about 8.0 liters per hour and rate of the supply of areation air was about 3.0 liters per minute. Temperature of water was about 13° C. The results of the test are listed in TABLE III.

TABLE III

| Sample | Waste water (Sewage) | Treated water from No. 1 treating tank* | Treated water from No. 2 treating tank* |
|---|---|---|---|
| Suspended Solids (p.p.m.) | 36.8 | 8.0 | 23.8 |

*see the Note for TABLE I

From TABLE III, it can be understood that the process using the apparatus according to the present invention is more effective in removing suspended solids than the submerged packing process employing a bundle of a number of long straight tubes as a packing.

In FIGS. 13 and 14, there is shown an another embodiment of a bundle 123 of straight tubes 143. This bundle 123 is different in construction from the foregoing bundle 23 in that crossing passages 144 are formed by perforating walls between two adjacent tubes 143, as shown in FIGS. 13 and 14 along lines across the bundle 123. It is preferred that the perforations or passages 144 are as large as possible. In this case, too, the foregoing advantages of the bundle 23 are exhibited because the crossing passages 144 have a function similar to the crossing passages 44 from the point of view of hydrodynamics.

TEST IV

A comparison test was carried out by using a bundle constructed according to FIGS. 13 and 14 and by using a bundle of long straight tubes. The former bundle and the latter bundle were made from polyethylene, respectively. The bundles have a length or height of about 60 centimeters and a cross-section of 320 square centimeters and were composed of 240 tubes, respectively. The former bundle was provided at every 5 centimeters along the length thereof fwith crossing passages each having a diameter of about 5 millimeters in a fashion similar to the bundle 123 shown in FIGS. 13 and 14. Each of the bundles was packed in a treating tank equipped with an aeration means which also plays a role of fluid recirculating means. Rate of reduction of COD in water solution of separated milk or skim milk which had a concentration of 174 milligrams per liter was measured by recirculating the solution in the respective treating tanks in a batch system. Temperature of the solution was maintained at 25° C and rate of flow through the respective bundles was ranged between 1 and 4 centimeters per second. The results of measurement are shown in FIG. 15 in which curve A represents the relation between lapse of time T and COD in the tank employing the bundle according to the present invention and curve D represents the relation between lapse of time T and COD in the tank employing the bundle according to the prior art. From FIG. 15, it can be understood that the apparatus according to the present invention decomposes organic substance in waste water more rapidly than the apparatus according to the prior art.

Having now described the invention and having exemplified the manner in which it can be carried into practise, it is apparent to those skilled in the art that innumerable variations, applications, modifications and extensions of the basic principle involved may be made without departing from the spirit of the present invention. The invention is, therefore, to be limited only by the scope of the appended claims.

What is claimed is:

1. An apparatus for treating waste water comprising at least one treating tank having an inlet for waste water and an outlet for treated water, at least one bundle of a number of straight tubes arranged in said treating tank so that the bundle is submerged in waste water to be treated in the tank, said bundle being provided with a plurality of crossing passages extending across the bundle which passages are arranged intermittently along the bundle with certain intervals therebetween so that each of the tubes is divided into a plurality of tube sections each having a length such that the length is substantially covered with a flow-disturbed portion due to flowing-in of water and another flow-disturbed portion due to flow-out of water in each tube section, and means for flowing waste water through said bundle in a direction along the bundle.

2. The apparatus for treating waste water as claimed in claim 1 wherein said crossing passages are formed by providing cut-off portions to said bundle intermittently along the longitudinal direction of bundle so that a plurality of spaced bundle members are formed.

3. The apparatus for treating waste water as claimed in claim 1 wherein said crossing passages are formed by providing perforations extending across said bundle to the walls of the tubes composing the bundle intermittently along the longitudinal direction of the bundle.

4. The apparatus for treating waste water as claimed in claim 1 wherein said means for flowing waste water is constructed so that the means forcedly recirculate the waste water in said treating tank through said bundle of straight tubes.

5. The apparatus for treating waste water as claimed in claim 4 wherein said means for recirculating waste water is constructed so that the means jetts air into the waste water so as to recirculate the water and also to enrich dissolved oxygen in the water.

6. The apparatus for treating waste water as claimed in claim 1 wherein an aeration means is provided in said treating tank.

7. The apparatus for treating waste water as claimed in claim 1 wherein means for sensing the clogging of said bundle of straight tubes is arranged in said treating tank.

8. The apparatus for treating waste water as claimed in claim 1 wherein means for regenerating said bundle of straight tubes is provided which is intermittently operated so as to flow a fluid under pressure through the bundle for removing sludge from inside said tubes.

9. The apparatus for treating waste water as claimed in claim 1 wherein means for scraping off sludge from the upper edge of the bundle of straight tubes is provided, said means for scraping off sludge comprising a net which is intermittently reciprocated so as to move on and along the upper edge of the bundle of straight tubes.

10. The apparatus for treating waste water as claimed in claim 1 wherein foam-eliminating means comprising a brush is provided above the water level in said treating tank.

11. The apparatus for treating waste water as claimed in claim 1 wherein the bottom of said treating tank is inclined toward a center groove for discharging sludge.

12. The apparatus for treating waste water as claimed in claim 11 wherein a conveyor belt for discharging sludge is arranged in said groove.

13. The apparatus for treating waste water as claimed in claim 1 wherein a plurality of the bundles of straight tubes are in parallel arranged in said treating tank in a row with remaining passages therebetween, a passage for waste water which is communicated to said inlet is provided at a side of the row of the bundles, and a passage for treated water is provided at the other side of the row of the bundles, said passages for waste water being communicated to every other passage between two adjacent bundles and shut off from the other passages between two adjacent bundles, and said passage for treated water being communicated to every other passage between two adjacent bundles which passage is shut off from the passage for waste water and shut off from the other passages between two adjacent bundles.

14. The apparatus for treating waste water as claimed in claim 1 wherein a plurality of similarly constructed treating tanks are in series arranged.

* * * * *